(No Model)
B. M. WILLINGER & J. DEVINS.
RECEPTACLE FOR MAIL MATTER, MILK, NEWSPAPERS, &c.
No. 584,137.　　　　　　　　　Patented June 8, 1897.
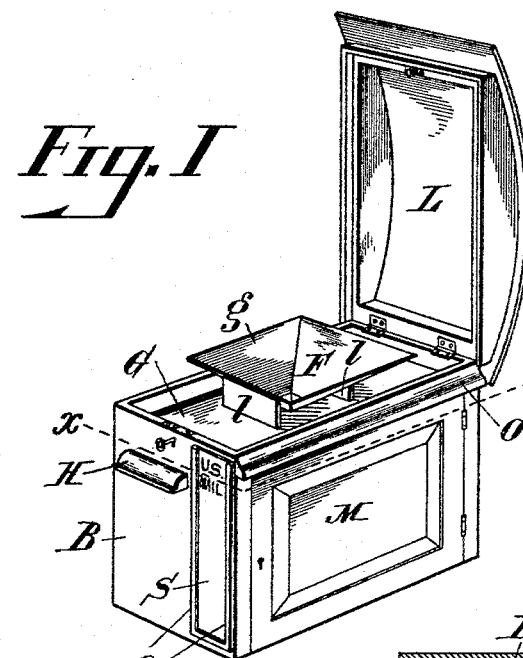
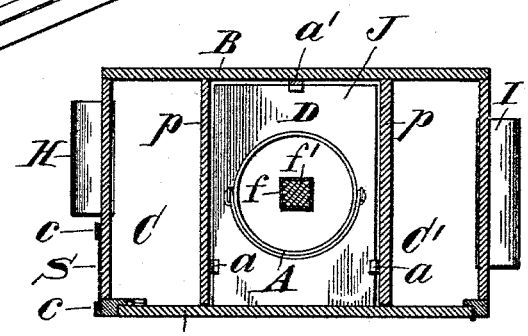
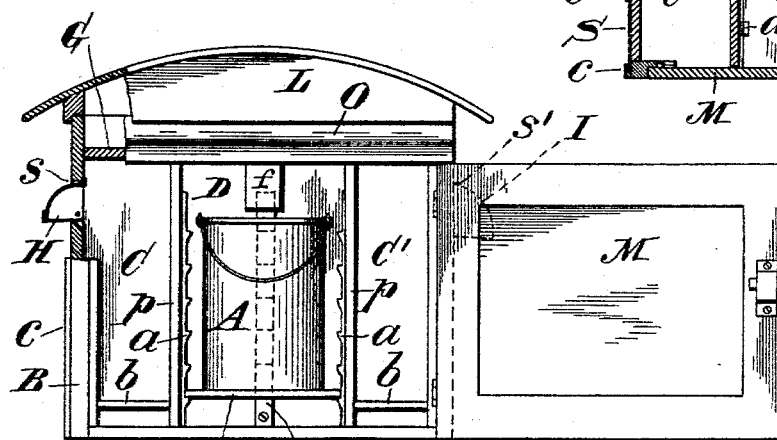
WITNESSES:
L. M. Jones
Sherwood R. Taylor
INVENTORS:
Bernard M. Willinger and
John Devins,
by John Elias Jones,
their attorney.

UNITED STATES PATENT OFFICE.

BERNARD M. WILLINGER AND JOHN DEVINS, OF CINCINNATI, OHIO.

RECEPTACLE FOR MAIL-MATTER, MILK, NEWSPAPERS, &c.

SPECIFICATION forming part of Letters Patent No. 584,137, dated June 8, 1897.

Application filed March 1, 1897. Serial No. 625,497. (No model.)

*To all whom it may concern:*

Be it known that we, BERNARD M. WILLINGER and JOHN DEVINS, citizens of the United States, residing at Cincinnati, in the county of Hamilton and State of Ohio, have jointly invented an Outdoor Lock Box or Receptacle for Mail-Matter, Milk, Newspapers, &c., of which the following is a specification.

Our invention relates to deposit boxes or receptacles which are mounted or placed outside of buildings or residences in the surrounding yard or elsewhere convenient to the deliveryman who has mail, milk, newspapers, or other matter for the occupants of said buildings; and it consists in the novel features of construction and arrangement, such as hereinafter fully described, and particularly pointed out in the claims.

In the accompanying drawings, Figure 1 is a perspective view of a deposit-box embodying our invention, the top lid being shown thrown open, as is done by the milkman for delivering the milk or by the owner for removing the funnel for cleaning or for changing the mail-indicator slide; Fig. 2, a front elevation, partly broken and in section, showing the front door thrown open, as is done by the occupants of the dwelling for access to the interior when it is desired to remove mail, milk, newspapers, or other matter therefrom or placing the milk-pail in its compartment under said funnel; and Fig. 3, a sectional plan taken on the dotted line $x\,x$ of Fig. 1.

We will now describe our deposit box or receptacle as follows: A rectangular box or casing B has a pair of vertical partitions $p\,p$ therein, which provide a side chamber C for letters or other mail-matter, a side chamber C' for newspapers, and a central or middle chamber D for milk or the like. An upper horizontal partition G is provided which forms a cover or top for the lower chambers C, C', and D and prevents access from above to said three lower chambers (C, C', and D) when the lid or cover L is raised or thrown open except to pour or deliver milk into pail A through the funnel F. The spout or lower end $f$ of the funnel projects downward through a snugly-fitting central orifice in the horizontal partition G, and the upper flaring portion $g$ is supported by means of side bars or legs $l\,l$. (Seen in Fig. 1.) The funnel is made readily removable, (when the lid is raised,) so as to facilitate cleaning. It is also provided with a gauze strainer $f'$ (see Fig. 3) for straining the milk when the deliveryman pours it therein. The shelf J for supporting the milk pail or pan A is adjustably and interchangeably supported on vertical side racks or toothed strips $a\,a$ and central vertical rear rack $a'$ to provide for either large or small vessels, (from a gallon-can down to a pint or even smaller cup,) whereby the vessel may be brought up close to the level or plane of the lower end of the spout and the milk prevented from splashing beside the can. When the front door is closed, it prevents the shelf J slipping away and falling from the rear rack-bar $a'$, as said shelf has its front edge very close or entirely contiguous to the inner face of said door, as best seen in Fig. 3. Horizontal openings or slots $s\,s'$ are made in both sides of the box, near the top thereof, for the reception or deposit of letters (say on the side to the left) and newspapers, (say on the side to the right.) Hoods or covers H and I, mounted so as to pivot inwardly, are provided in said slots to protect against flying dirt and the weather and also to shed water. The lid L is dome-shaped for the accommodation of the funnel and readily shedding water, and a strip O is provided over the top of the front door M, both for protection against dirt and the weather and to shed water also. The lid L and door M are both suitably hinged, and suitable locks (preferably automatically-closing spring ones) are provided thereon.

The receptacle is especially useful for people living in the suburbs where they have large yards, and the milk, mail, newspapers, and other contents are easily deposited therein, safely locked in their respective compartments against intrusion or petty thievery, or against dust, insects, and any tampering therewith.

The milkman has a key to the top lid, so that he can raise it and pour the milk in the funnel, which guides or conducts it to the can within the chamber below, but he cannot get at the mail or the newspaper in the locked apartments below, as the front door is locked with a lock having a different key, and the horizontal partition G prevents access from above. No one has a key to the front door save the house occupants, who can readily get the mail, milk, and newspaper—in fact, all the contents from within—by simply opening said front door. A slide S may be provided, however, to indicate to the postman (say when the red side is out) that there is mail within for delivery at the post-office, and in that event he has a duplicate key whereby he can remove said mail for the post-office. When there is no mail for the post-office, then the slide is placed in its guideway $c$ with its blank side or back facing outward. Said slide is manipulated to and from its guideway from above and when the lid is raised.

The auxiliary raised bottoms or shelves $b$ are provided to raise the floors of the mail and newspaper compartments above the level of the bottom of milk-apartment, so that said mail and newspaper may not be wet or damaged by any overflow or leakage of the milk. Holes or perforations can also be provided in the bottom of the milk-chamber only to guard against such mishaps and allow any milk to drain therethrough should it leak from or overflow the pail or can A.

The box may be mounted or attached in any suitable place either in the yard or in the dwelling or other building convenient to all those using it.

We claim—

1. A safety outdoor receptacle for mail, milk, and other matter, composed of a main box or outer case; one or more upright partitions dividing said case into two or more compartments or chambers; upright side and rear rack or toothed bars in one of said chambers; a horizontal shelf adjustably and removably mounted on said side and rear rack-bars; a fixed horizontal cover or top over said chambers to prevent access thereto from above; a removable, vertically-supported funnel, whose spout passes snugly through an opening in said horizontal top for guiding the milk from above to the pail or can supported on said shelf; a front door suitably hinged and locked, and adapted to be opened for access to said chambers; a hinged lid having a suitable lock and adapted to be opened for access to said funnel; and suitable openings in the case for inserting mail-matter or the like within; substantially as herein set forth.

2. A safety outdoor receptacle for mail, milk, and other matter, composed of an outer case or main box divided into compartments or chambers C, C', and D; a vertically-adjustable shelf J in said chamber D for supporting the milk-receiving pail or cup; a fixed horizontal partition or top G over the said chambers C, C', and D, to prevent access thereto from above; a front door M, suitably hinged and locked, and adapted to be opened for access to said chambers C, C' and D, to remove their contents therefrom and place the milk-pail therein; a removable, suitably-supported funnel F, whose spout $f$ passes snugly through an opening in the center of partition G for guiding or conveying the milk from above to the can or pail within the chamber D; a hinged lid or cover L, having a suitable lock, and adapted to be opened for access to said funnel for the delivery of the milk and to clean said funnel; a strainer-gauze in said funnel; and a slide in the side for indicating the presence of mail within the box for delivery at the post-office; and suitable openings $s$, $s'$, having hoods or caps thereover, for the placing of the mail-matter and newspapers within chambers C and C'; substantially as herein set forth.

In testimony of which invention we have hereunto set our hands.

BERNARD M. WILLINGER.
JOHN DEVINS.

Witnesses:
JOHN ELIAS JONES,
L. M. JONES.